(12) United States Patent
Shepelev et al.

(10) Patent No.: US 10,261,619 B2
(45) Date of Patent: Apr. 16, 2019

(54) ESTIMATING FORCE APPLIED BY AN INPUT OBJECT TO A TOUCH SENSOR

(71) Applicant: SYNAPTICS INCORPORATED, San Jose, CA (US)

(72) Inventors: Petr Shepelev, Campbell, CA (US); Arnulf Graf, Pasadena, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 257 days.

(21) Appl. No.: 14/986,088

(22) Filed: Dec. 31, 2015

(65) Prior Publication Data
US 2017/0060314 A1 Mar. 2, 2017

Related U.S. Application Data

(60) Provisional application No. 62/212,094, filed on Aug. 31, 2015.

(51) Int. Cl.
*G06F 3/044* (2006.01)
*G06F 3/041* (2006.01)

(52) U.S. Cl.
CPC .......... *G06F 3/0416* (2013.01); *G06F 3/044* (2013.01); *G06F 3/0418* (2013.01)

(58) Field of Classification Search
CPC ....... G06F 3/0416; G06F 3/044; G06F 3/0418
See application file for complete search history.

(56) References Cited

U.S. PATENT DOCUMENTS

| | | |
|---|---|---|
| 5,854,625 A | 12/1998 | Frisch et al. |
| 5,942,733 A | 8/1999 | Allen et al. |
| 5,945,980 A | 8/1999 | Moissev et al. |
| 6,002,389 A | 12/1999 | Kasser |
| 6,034,672 A | 3/2000 | Gaultier et al. |
| 6,642,857 B1 | 11/2003 | Schediwy et al. |
| 7,158,122 B2 | 1/2007 | Roberts |
| 7,511,702 B2 | 3/2009 | Hotelling |
| 8,462,135 B1 | 6/2013 | Xiao et al. |
| 8,570,297 B2 | 10/2013 | Bulea et al. |
| 9,063,564 B2 | 6/2015 | Lombardi et al. |
| 9,069,405 B2 | 6/2015 | Grivna et al. |
| 2002/0149571 A1 | 10/2002 | Roberts |
| 2003/0137494 A1* | 7/2003 | Tulbert ............. G06F 3/0423 345/173 |
| 2003/0206162 A1 | 11/2003 | Roberts |
| 2004/0227736 A1 | 11/2004 | Kamrath et al. |
| 2006/0227114 A1 | 10/2006 | Geaghan et al. |
| 2008/0006453 A1 | 1/2008 | Hotelling |

(Continued)

FOREIGN PATENT DOCUMENTS

| | | |
|---|---|---|
| WO | 1994002921 A1 | 2/1994 |
| WO | 15106183 A1 | 7/2015 |

*Primary Examiner* — Jonathan A Boyd
(74) *Attorney, Agent, or Firm* — Patterson + Sheridan, LLP

(57) ABSTRACT

Techniques for determining force applied by an input object in a sensing region of an input device are provided. The techniques generally include driving a plurality of sensor electrodes within a sensing region to acquire sensor data, generating a first histogram based on the sensor data, the first histogram including a plurality of bins each having an associated value, and based on the values associated with at least a subset of the plurality of bins of the first histogram, determining force information for an input object.

21 Claims, 7 Drawing Sheets

(56) References Cited

U.S. PATENT DOCUMENTS

| | | |
|---|---|---|
| 2008/0078590 A1 | 4/2008 | Sequine |
| 2009/0066673 A1 | 3/2009 | Molne et al. |
| 2009/0115733 A1 | 5/2009 | Ma et al. |
| 2009/0243817 A1 | 10/2009 | Son |
| 2010/0026655 A1 | 2/2010 | Harley |
| 2010/0066670 A1 | 3/2010 | Amm et al. |
| 2010/0139990 A1 | 6/2010 | Westerman et al. |
| 2010/0200309 A1 | 8/2010 | Yilmaz et al. |
| 2010/0277431 A1 | 11/2010 | Klinghult |
| 2010/0308844 A1 | 12/2010 | Day et al. |
| 2011/0005845 A1 | 1/2011 | Hotelling et al. |
| 2011/0037624 A1 | 2/2011 | Pance et al. |
| 2011/0141052 A1 | 6/2011 | Bernstein et al. |
| 2011/0153243 A1 | 6/2011 | Modafe |
| 2011/0175671 A1 | 7/2011 | Reynolds |
| 2011/0278078 A1 | 11/2011 | Schediwy et al. |
| 2012/0068966 A1 | 3/2012 | Washburn et al. |
| 2012/0120017 A1 | 5/2012 | Worfolk et al. |
| 2012/0146935 A1 | 6/2012 | Bulea |
| 2013/0016045 A1* | 1/2013 | Zhao .................... G06F 3/0416 345/173 |
| 2013/0018489 A1 | 1/2013 | Grunthaner et al. |
| 2013/0033450 A1 | 2/2013 | Coulson et al. |
| 2013/0038554 A1 | 2/2013 | West |
| 2013/0076646 A1 | 3/2013 | Krah et al. |
| 2013/0135244 A1 | 5/2013 | Lynch et al. |
| 2013/0234977 A1 | 9/2013 | Lin et al. |
| 2013/0321337 A1* | 12/2013 | Graham ............. G06F 3/03547 345/174 |
| 2013/0342501 A1 | 12/2013 | Molne et al. |
| 2014/0028575 A1 | 1/2014 | Parivar et al. |
| 2014/0085213 A1 | 3/2014 | Huppi et al. |
| 2014/0085247 A1 | 3/2014 | Leung et al. |
| 2014/0092052 A1 | 4/2014 | Grunthaner et al. |
| 2014/0247239 A1 | 9/2014 | Jamshidi-Roudbari et al. |
| 2014/0293145 A1 | 10/2014 | Jones et al. |
| 2016/0034088 A1* | 2/2016 | Richards ................ G01L 1/205 345/173 |

* cited by examiner

ESTIMATING FORCE APPLIED BY AN INPUT OBJECT TO A TOUCH SENSOR

CROSS-REFERENCE TO RELATED APPLICATION

This application is a non-provisional application claiming priority to U.S. Provisional Patent Application Ser. No. 62/212,094 filed Aug. 31, 2015, which is incorporated by reference in its entirety.

BACKGROUND

Field of the Disclosure

Embodiments generally relate to input sensing and, in particular, to estimating force applied by an input object to a touch sensor.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Many proximity sensors do not have the ability to accurately measure the force applied by an input object within the sensing region.

SUMMARY

In one embodiment, a force sensing device is provided. The force sensing device includes a plurality of sensor electrodes within a sensing region. The force sensing device also includes a processing system. The processing system is configured to drive the plurality of sensor electrodes to acquire sensor data. The processing system is further configured to generate a first histogram based on the sensor data, the first histogram including a plurality of bins each having an associated value. The processing system is also configured to, based on the values associated with at least a subset of the plurality of bins of the first histogram, determine force information for an input object.

In another embodiment, a processing system is provided. The processing system includes a sensor circuitry, configured to drive a plurality of sensor electrodes within a sensing region to acquire sensor data. The processing system also includes a determination processor that is configured to generate a first histogram based on the sensor data, the first histogram including a plurality of bins each having an associated value and, based on the values associated with at least a subset of the plurality of bins of the first histogram, determine force information for an input object.

In a further embodiment, a method is provided. The method includes driving a plurality of sensor electrodes within a sensing region to acquire sensor data. The method also includes generating a first histogram based on the sensor data, the first histogram including a plurality of bins each having an associated value. The method further includes based on the values associated with at least a subset of the plurality of bins of the first histogram, determining force information for an input object.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide techniques for estimating force applied by an input object. The techniques generally include driving a plurality of sensor electrodes within a sensing region to acquire sensor data, generating a first histogram based on the sensor data, the first histogram including a plurality of bins each having an associated value, and based on the values associated with at least a subset of the plurality of bins of the first histogram, determining force information for an input object.

Figure 1:
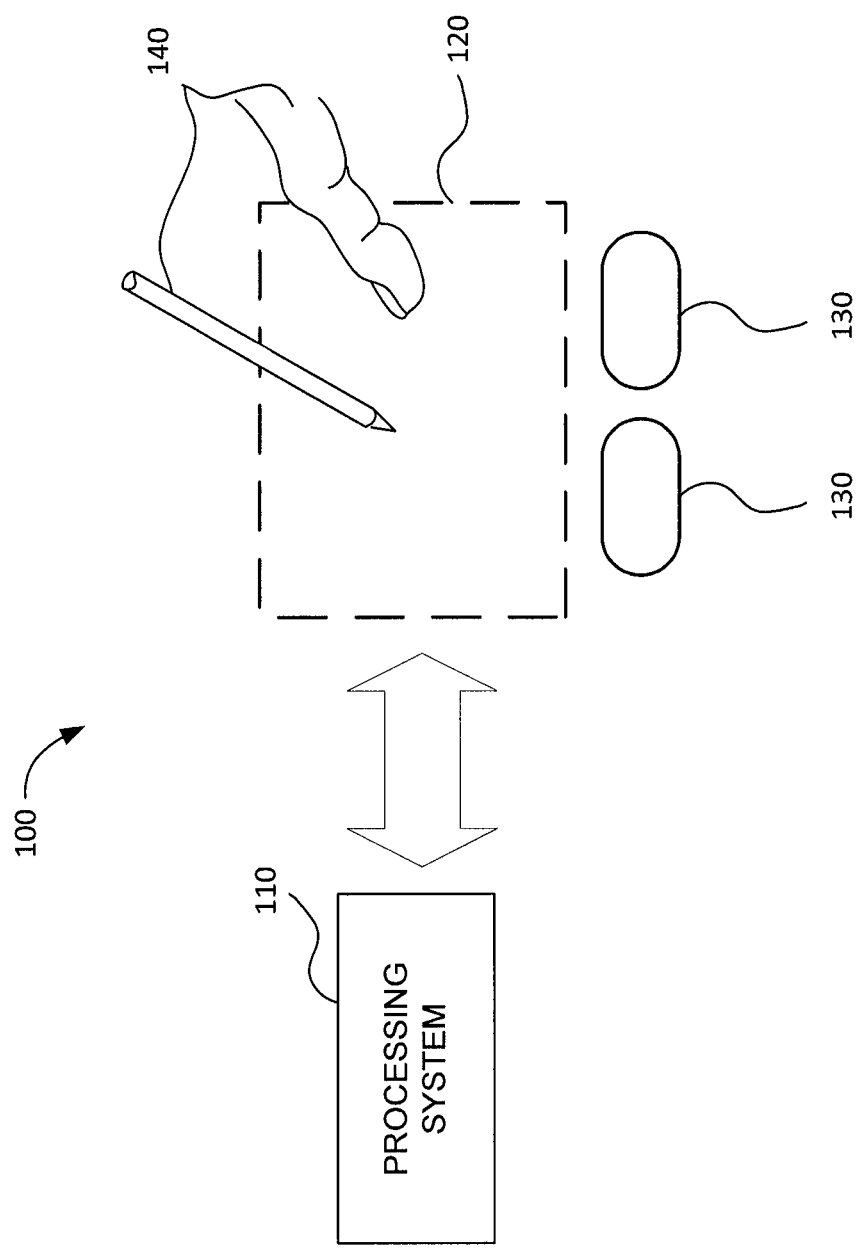
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
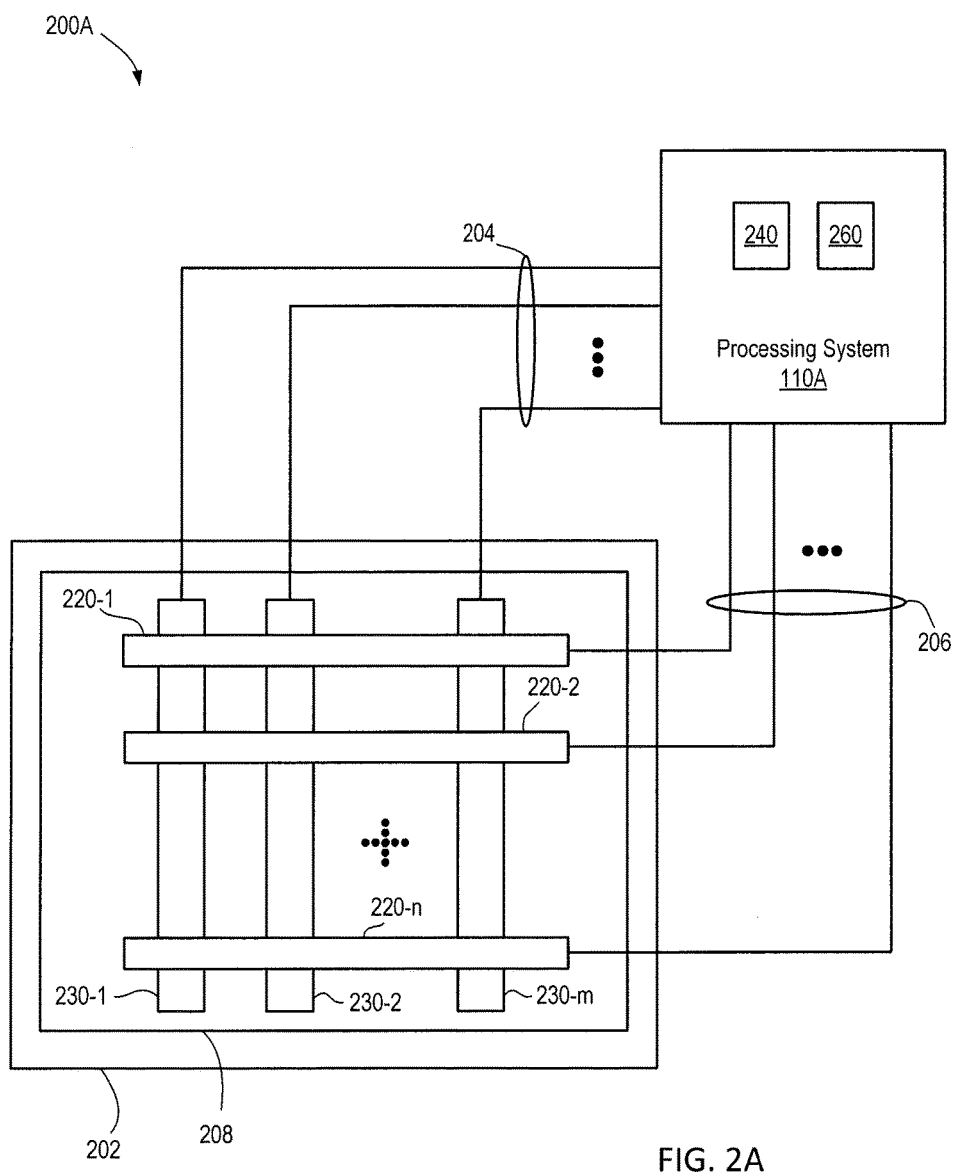
FIG. 2A is a block diagram depicting a capacitive sensor device according to an example.

FIG. 2A is a block diagram depicting a capacitive sensor device 200A according to an example. The capacitive sensor device 200A comprises an example implementation of the input device 100 shown in FIG. 1. The capacitive sensor device 200A includes a sensor electrode collection 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.). Note that in some embodiments, unless otherwise stated, processing system 110B performs the same functionality as processing system 110A.

The sensor electrode collection 208 is disposed on a substrate 202 to provide the sensing region 120. The sensor electrode collection 208 includes sensor electrodes disposed on the substrate 202. In the present example, the sensor electrode collection 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensor electrode collection 208 is shown with the sensor electrodes 220, 230 generally arranged in a rectangular grid of intersections of orthogonal sensor electrodes. It is to be understood that the sensor electrode collection 208 is not limited to such an arrangement, but instead can include numerous sensor patterns. Although the sensor electrode collection 208 is depicted as rectangular, the sensor electrode collection 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). In some embodiments, sensor electrodes 220 may be driven as transmitter electrodes and sensor electrodes 230 may be operated as receiver electrodes. The sensor electrodes 230 can have the same or different geometry as the sensor electrodes 220. In an example, the sensor electrodes 230 are wider and more closely distributed than the sensor electrodes 220, which are thinner and more sparsely distributed. Similarly, in an embodiment, sensor electrodes 220 may be wider and/or more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
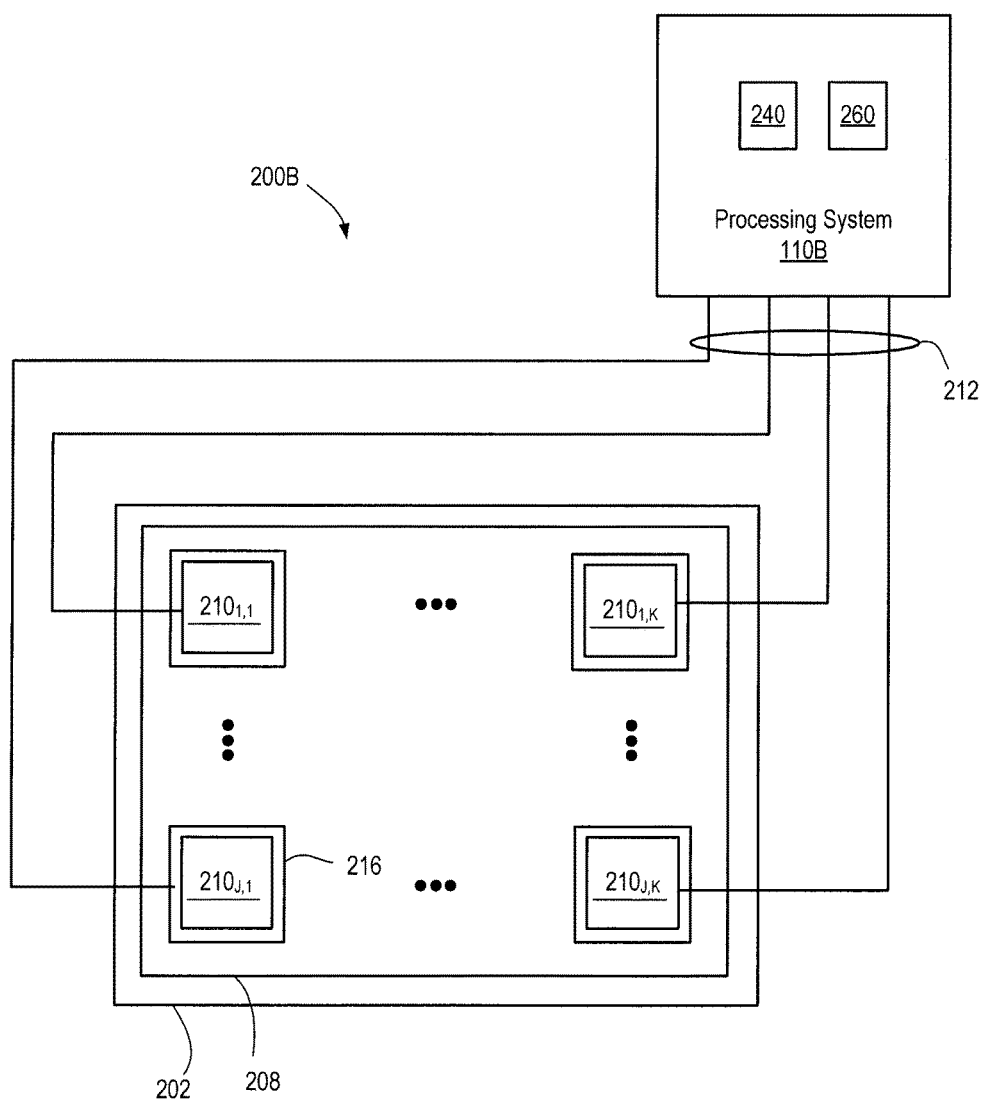
FIG. 2B is a block diagram depicting another capacitive sensor device according to an example.

FIG. 2B is a block diagram depicting a capacitive sensor device 200B according to an example. The capacitive sensor device 200B comprises another example implementation of the input device 100 shown in FIG. 1. In the present example, the sensor electrode collection 208 includes a plurality of sensor electrodes $210_{1,1}$ through $210_{J,K}$, where J and K are integers (collectively "sensor electrodes 210"). In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. In various embodiments, the grid electrode(s) is optional and may not be included. Similar to the capacitive sensor device 200A, the processing system 110B can operate the sensor electrodes 210 according to a plurality of excitation schemes, including excitation scheme(s) for transcapacitive sensing and/or absolute capacitive sensing.

In some examples, the sensor electrodes 210 can be disposed on separate layers of the substrate 202. In other examples, the sensor electrodes 210 can be disposed on a single layer of the substrate 202. The sensor electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate. The processing system 110B is coupled to the sensor electrodes 210 through the conductive routing traces 212 to implement the sensing region 120 for sensing inputs.

In one or more embodiments, sensor electrode collection 208 may further comprise one or more grid electrodes that are disposed between sensor electrodes 210. The grid electrode(s) may at least partially encompass one or more of the sensor electrodes 210.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode collection 208.

In general, the processing system 110 (e.g., processing system 110A or processing system 110B) excites or drives sensing elements of the sensor electrode collection 208 with a sensing signal and measures an induced or resulting signal that includes effects corresponding to at least one of the sensing signal, an input object, and interference in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110 drives one or more sensor electrodes of the sensor electrode collection 208 with a voltage and senses resulting respective charge on the sensor electrode(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110 can determine measurement(s) of capacitance from the sensed charge. In another example, the processing system 110 drives one or more sensor electrodes of the sensor electrode collection 208 with charge and senses resulting respective voltage on the sensor electrode(s). That is, the sensing signal is a signal to cause accumulation of charge (e.g., current signal) and the resulting signal is a voltage signal. The processing system 110 can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110 can include a sensor circuitry 240. The sensor circuitry 240 performs sensing-related functions of the processing system 110, such as driving sensor electrodes with signals for sensing, receiving signals from sensor electrode for processing, and other functions. The sensor circuitry 240 may be part of a sensor module that includes firmware, software, or a combination thereof operating in cooperation with the circuitry.

In some embodiments processing system 110 includes a determination module 260. The determination module 260 may be embodied as, or may include, a determination processor that is configured to perform some or all of the operations described as being performed by the determination module 260 herein, such as analyzing signals received via sensor circuitry 240 to determine presence of an input object. In some embodiments, the determination processor is a microcontroller that executes instructions, in the form of software or firmware, for performing such operations. In other embodiments, the determination processor is an application specific integrated circuit having circuit elements selected and arranged to perform the described operations.

Note that functionality performed by sensor circuitry 240 and determination module 260 may be considered to be performed by processing system 110. Note also that although both sensor circuitry 240 and determination module 260 are described, and that specific functionality are ascribed to these elements, in various embodiments, functionality may be split amongst the sensor circuitry 240 and determination module 260 in different ways.

The sensor circuitry 240 selectively drives sensing signal(s) on one or more sensing elements of the sensor electrode collection 208 over one or more cycles ("excitation cycles") in accordance with one or more schemes ("excitation schemes"). During each excitation cycle, the sensor circuitry 240 can selectively sense resulting signal(s) from one or more sensing elements of the sensor electrode collection 208. Each excitation cycle has an associated time period during which sensing signals are driven and resulting signals measured.

In one type of excitation scheme, the sensor circuitry 240 can selectively drive sensing elements of the sensor electrode collection 208 for absolute capacitive sensing. In absolute capacitive sensing, the sensor circuitry 240 drives selected sensor electrode(s) with an absolute sensing signal and senses resulting signal(s) from the selected sensor electrode(s). In such an excitation scheme, measurements of absolute capacitance between the selected sensing element(s) and input object(s) are determined from the resulting signal(s). In an example, the sensor circuitry 240 can drive selected sensor electrodes 220, and/or selected sensor electrodes 230, with an absolute sensing signal. In another example, the sensor circuitry 240 can drive selected sensor electrodes 210 with an absolute sensing signal.

In another type of excitation scheme, the sensor circuitry 240 can selectively drive sensing elements of the sensor electrode collection 208 for transcapacitive sensing. In transcapacitive sensing, the sensor circuitry 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor circuitry 240 can drive the sensor electrodes 230 with transmitter signal(s) and receive resulting signals on the sensor electrodes 220. In another example, the sensor circuitry 240 can drive selected sensor electrodes 210 with transmitter signal(s), and receive resulting signals from others of the sensor electrodes 210.

In any excitation cycle, the sensor circuitry 240 can drive sensing elements of the sensor electrode collection 208 with other signals, such as shielding or shield signals. A shield signal may be any substantially constant voltage signal or a varying voltage signal. The sensor electrodes of sensor electrode collection 208 that are not driven with a sensing signal, or sensed to receive resulting signals, can be driven with a shield signal or left floating (i.e., not driven with any signal). The shield signal may be a ground signal (e.g., system ground) of the input device. A shield signal comprising a varying voltage signal may also be referred to as a guard signal. Such a signal can be a signal that is similar or the same in at least one of shape, amplitude, frequency, or phase of a transmitter signal or the absolute capacitive sensing signal.

"System ground" may indicate any reference voltage of the input device 100. For example, a capacitive sensing system of a mobile device can, at times, be referenced to a system ground provided by the phone's power source (e.g., a charger or battery). The system ground may not be fixed relative to earth or any other reference. For example, a mobile device on a table usually has a floating system ground. A mobile device being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor circuitry 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor circuitry 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110 can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type.

In addition to determining position of an input object 140, processing system 110 is also able to determine force applied by an input object 140 to the input device 100. More specifically, in some embodiments, the input device 100 includes a cover element, such as a glass or plastic cover element that is laid over the sensor electrode collection 208. When an input object 140 contacts the input device 100, one or more of the sensor electrodes 208 may deflect toward or move closer to one or more conductive electrodes, and processing system 110 is configured to measure the change in distance between the one or more sensor electrodes and the one or more conductive electrodes. In one or more embodiments, as the one or more sensor electrodes is deflected toward the one or more conductive electrodes, the capacitance between the one or more sensor electrodes and the one or more conductive electrodes changes and can be measured by processing system 110. In such embodiments, the one or more conductive electrodes may be held at a substantially constant voltage while the one or more sensor electrodes are driven for absolute capacitive sensing. Further, in another embodiment, the one or more conductive electrodes may be driven with transmitter signals while the one or more sensor electrodes may be operated as receiver electrodes. In yet other embodiments, the one or more conductive electrodes may be operated as receiver electrodes while the one or more sensor electrodes are driven as either transmitter signals or absolute capacitive signals. In various embodiments, the conductive electrodes may be one or more electrodes of the input device, such as a shield electrode or one or more electrodes of a display device. Further, in other embodiments, the one or more conductive electrodes may be disposed anywhere within the input device 100.

Note that in addition to the capacitance changes caused by deflection, processing system 110 also detects changes in capacitance caused by presence of an input object 140. Thus, signals received by processing system 110 from sensor electrodes include contributions from both the force-related sensor electrode deflection and the presence of the input object 140 in the sensing area. Distinguishing components of the signals related to presence of the input object 140 from components of the signals related to force input is not trivial.

Thus, techniques are provided herein for determining input force based on the signals received from sensor electrodes. These techniques are histogram-based techniques, whereby a histogram associated with the received signals is generated and analyzed to determine input force of one or more input objects. Note that the histogram-based techniques may be used with a variety of capacitive sensing techniques, such as the absolute capacitive sensing techniques or transcapacitive sensing techniques described above with respect to FIG. 1 and FIGS. 2A-2B. Further, note that the histogram-based techniques may be used for in-cell sensors (in which sensor electrodes comprise at least a portion of display elements), on-cell sensors (in which sensor electrodes are laid up over the display elements), or discrete sensors (in which a sensor assembly is a discrete component from a display assembly).

In any of the sensor electrode arrangements discussed above, the sensor electrodes 208 may be formed on a substrate that is external to or internal to the display device. For example, the sensor electrodes 208 may be disposed on the outer surface of a lens in the input device 100. In other embodiments, the sensor electrodes 208 are disposed between the color filter glass of the display device and the lens of the input device. In other embodiments, at least a portion of the sensor electrodes may be disposed such that they are between a Thin Film Transistor substrate (TFT substrate) and the color filter glass of the display device. In one embodiment, a first plurality of sensor electrodes is disposed between the TFT substrate and color filter glass of the display device and the second plurality of sensor electrodes are disposed between the color filter glass and the lens of the input device 100. In yet other embodiments, all of sensor electrodes 208 are disposed between the TFT substrate and color filter glass of the display device, where the sensor electrodes may be disposed on the same substrate or on different substrates as described above.

Figure 3:
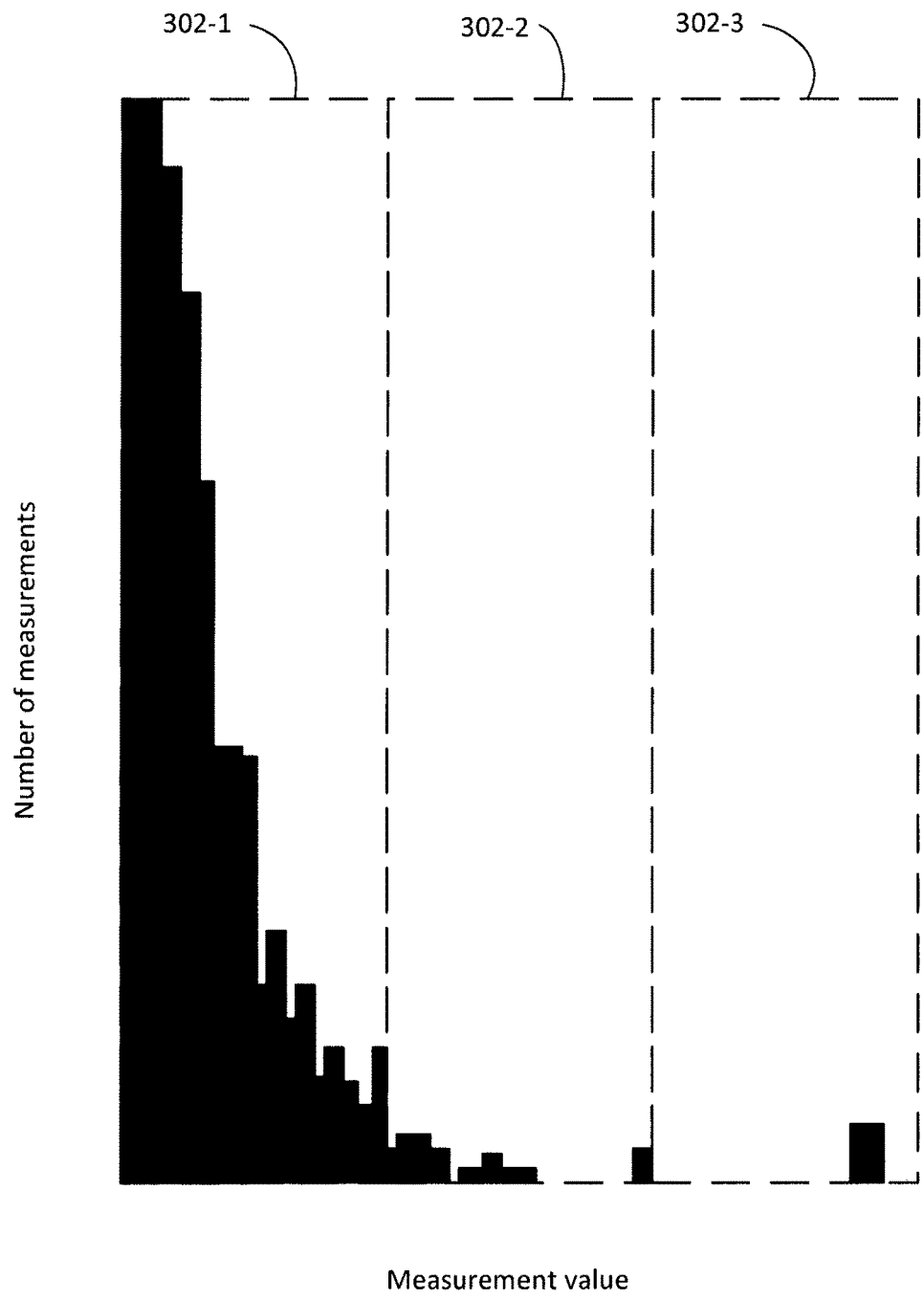
FIG. 3 is a histogram of values associated with signals received with sensor electrodes, according to an example.

FIG. 3 is a histogram 300 of values associated with signals received with sensor electrodes (which may be, for example, any of sensor electrodes 210, sensor electrodes 220, or sensor electrodes 230, operating in absolute capacitance mode or as transmitter or receiver electrodes in transcapacitance mode), according to an example. The histogram 300 plots measurement values versus count of each such measurement, where the measurements may include contributions both from capacitive coupling to an input object and from displacement of sensor electrodes with respect to one or more conductive electrodes. Each black vertical bar illustrated represents a count of a particular range of measurements for signals received with sensor electrodes. The range for each vertical bar is referred to as a "bin," which is a histogram term that refers to a range of measurements over which a count is taken. For instance, one bin might be from values 20.5 to 21.8 (in arbitrary units used for purposes of explanation). If three received signals for a particular capacitive image fall within this range, then the count for a corresponding vertical bar of the histogram would be 3.

There are three different bin groups 302 illustrated in FIG. 3. These different bin groups 302 represent bin groups associated with qualitatively different input phenomena. More specifically, the first bin group 302-1 represents bins associated with no input object 140 and little to no force applied. The second bin group 302-2 represents bins associated with force applied, but not associated with the actual capacitive signal from the input object 140. Finally, the third bin group 302-2 represents bins associated with capacitive sensing of an input object 140. Note that although three bin grounds 302 are illustrated in FIG. 3, embodiments disclosed herein may work with a different number of bin groups 302.

The first bin group 302-1 includes bins having a low measurement value. These bins are associated with locations in the sensing area in which little to no changes in capacitance as compared with baseline measurements are observed. The measurements in these bins may be considered to be dominated by noise. Conceptually, these bins can be thought of as not being affected by either the force of the input object 140 or by capacitive coupling to the input object 140.

The second bin group 302-2 includes bins having mid-level measurement values. These bins are associated with locations in the sensing area that are associated with a force applied by the input object 140, but that are substantially capacitively unaffected by the input object 140.

The third bin group 303-3 includes bins having high-level measurement values. These bins represent locations that are substantially affected by capacitive coupling with the input object 140. Note that these areas are also affected by force applied by an input object 140 (if present). However, because capacitive coupling produces a larger signal amplitude than input object force, bins having high-level measurement values are indicative of locations where capacitive coupling occurs.

Note that the terms "low measurement value," "mid-level measurement value" and "high-level measurement value" refers to the tuned groups of bins—i.e., the first bin group 302-1, the second bin group 302-2, and the third bin group 302-3, respectively. Note also that although the different bin groups 302 are illustrated in FIG. 3 as being comprised of bins whose measurements are contiguous, bin groups 302 may instead be "split" and non-contiguous. For example, the second bin group 302-2 may include a bin consisting of measurement values between 5 and 6 (arbitrary units) and a bin consisting of measurement values between 7 and 8 (arbitrary units), but may not include a bin consisting of measurement values between 6 and 7 arbitrary units.

The second bin group 302-2 is deemed to be associated with the force applied by the input object 140. Processing system 110 thus analyzes the data in the second bin group 302-2 to determine an estimate of the force of an input object 140. More specifically, processing system 110 determines which bins to include in the second bin group 302-2 based on a tuning procedure, and optionally based on a determined location of an input object 140. Subsequently, processing system 110 generates a histogram based on the included bins and processes the histogram to obtain an estimate of force applied by an input object.

Figure 4:
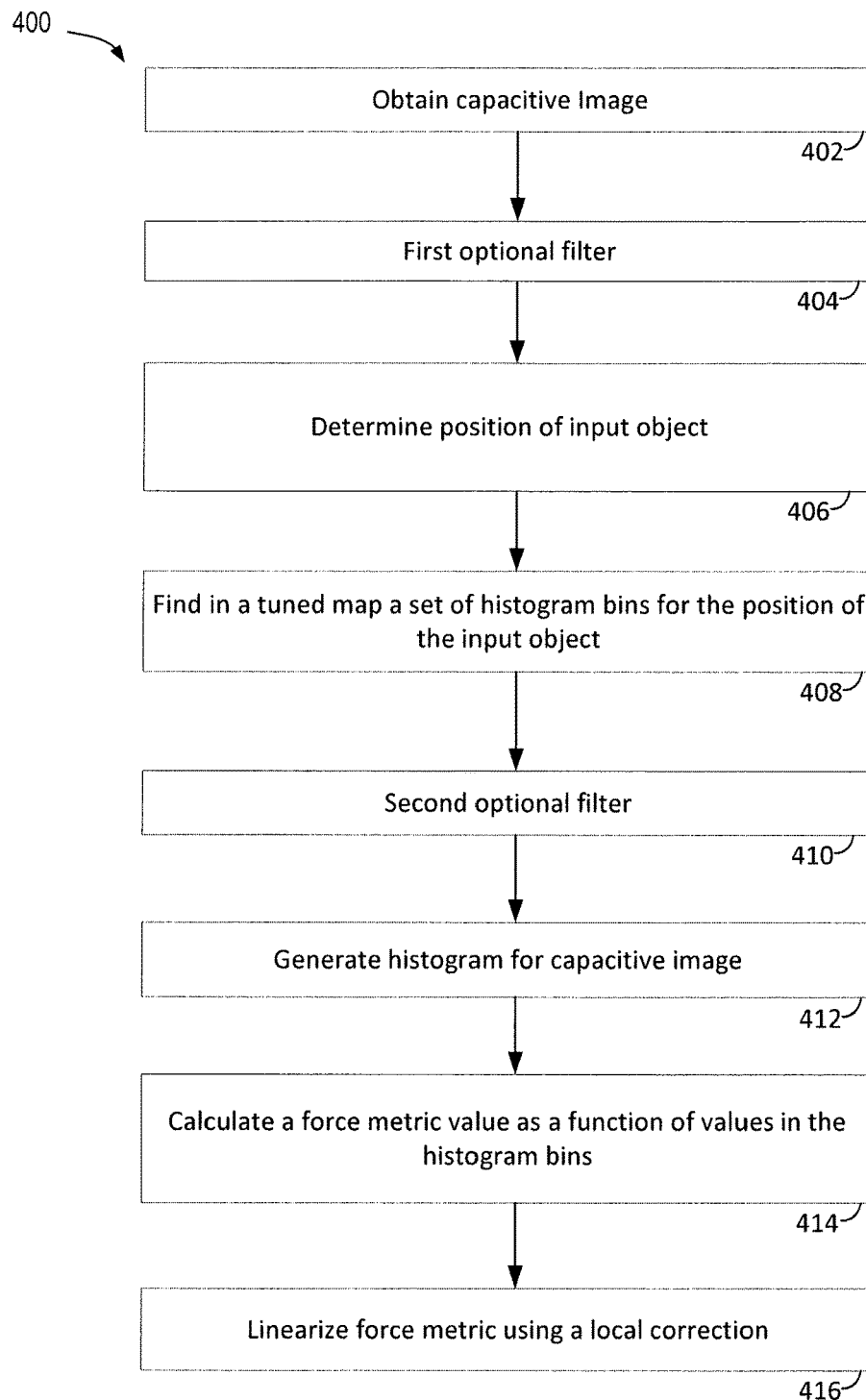
FIG. 4 illustrates a method for estimating force of a touch event based on presence of a single input object, according to an example.
Figure 5:
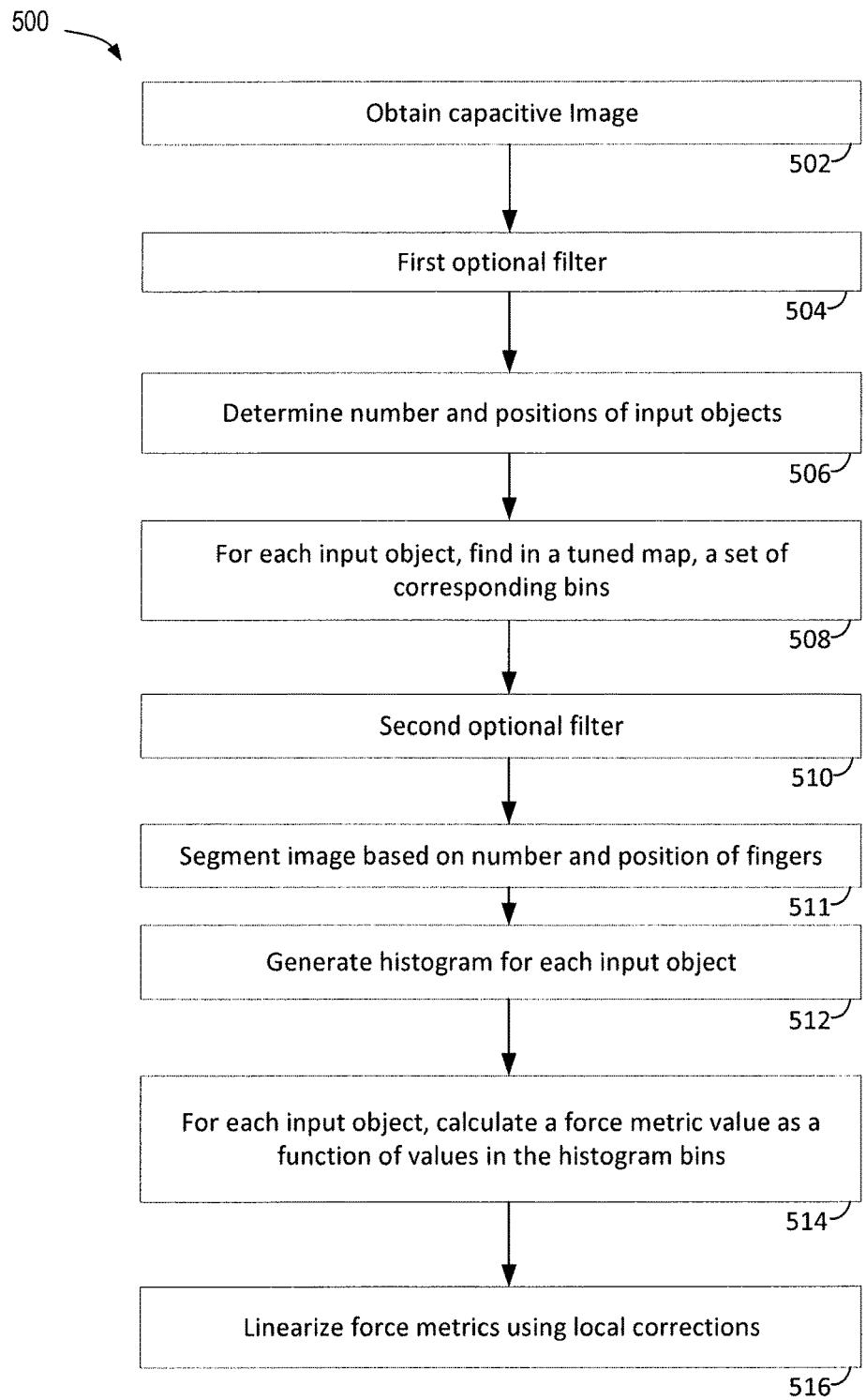
FIG. 5 illustrates a method for estimating force of multiple touch events based on presence of multiple input objects, according to an example.

FIGS. 4 and 5 present, in greater detail, techniques for estimating force of an input object based on histogram data. FIG. 4 presents a technique for estimating force when one input object is present and FIG. 5 presents a technique for estimating force when multiple input objects are present. Note that in the descriptions provided herein, operations related to determining force applied by an input object may be performed by the determination module 260 discussed above and operations related to driving sensor electrodes for sensing or receiving signals with sensor electrodes may be performed by sensor module 240.

FIG. 4 illustrates a method 400 for estimating force of a touch event based on presence of a single input object 140, according to an example. Although described with respect to the system of FIGS. 1 and 2A-2B, those of skill in the art will recognize that the method 400, performed in the context of any system capable of performing the method 400, and in various technically feasible alternative orders, falls within the scope of the present disclosure.

As shown, the method 400 begins at step 402, where an input device 100 obtains a capacitive image. A capacitive image includes sensing values for multiple locations in a sensing area. Processing system 110 may obtain the sensing values by operating the sensor electrodes in at least one of a transcapacitive or an absolute capacitive sensing mode, as described in further detail above with respect to FIGS. 1 and 2A-2B. Processing system 110 may process the resulting signals received from the sensor electrodes by, for example, demodulating the signals, filtering the signals (e.g., via a low-pass filter), and converting the signals to digital values. The result of this processing is a capacitive image including digital values representing signals received at a variety of locations in a sensing area.

At step 404, processing system 110 optionally applies a first filter to the capacitive image. The first filter is optional and may comprise either or both of a spatial filter and a temporal filter. The filters may be used to remove spatial or temporal artifacts. In various embodiments a spatial filter may correspond to the shape and/or features of the one or more conductive electrodes. The one or more conductive electrodes may have any number of holes, indentations, and other variations. Sensor electrodes that at least partially overlap a hole, indentations or other variation may be affected differently when force is applied as compared to a sensor electrode that does not overlap a hole, indentation or other variation. A spatial filter may be built based on the features of the one or more conductive electrode such that the values in the histogram may be normalized based on the amount of overlap. In one embodiment, a matrix may be constructed, wherein each element of the matrix corresponds to the amount of overlap between a sensor electrode and a hole, indentation, or other variation of one or more conductive electrodes and the matrix may be combined with the touch position when building the histogram. A value of zero may correspond to an area where the sensor electrodes do not overlap a hole, indentation, or other variation of one more conductive electrodes and a value of one may be applied to a complete overlap. Values between zero and one may be applied based on the amount of partial overlap that exists. A temporal filter may be applied based on the amount of time an input object is present in the sensing region of the input device. If an input object is not present for a threshold amount of time, the corresponding values may be weighted differently than if an input object is present for an amount of time greater than the threshold amount. For example, force values that correspond to a touch not being present for a threshold amount of time may not be reported. Further, force values that correspond to a touch being down for a long period of time may cease to be reported. Other filters that may be applied include jitter filters and noise filters.

At step 406, processing system 110 determines position of an input object 140 in the sensing region, based on the capacitive image. In some embodiments, processing system 110 determines position of an input object 140 as corresponding to the highest value or values in the capacitive image. In other words, the position at which the highest value is found may be deemed to be the position of the input object 140. In other embodiments, a best fit technique is utilized, wherein a signature is constructed from the obtained sensing data and is fit to a model to determine the degree to which the signature matches the model. These examples should not be taken to be limiting and processing system 110 can use other techniques to determine position of the input object 140.

At step 408, processing system 110 finds, in a tuned map, a set of histogram bins corresponding to the determined position of the input object 140. This set of histogram bins corresponds to the second bin group 302-2 described above. The tuned map includes pre-tuned data that, for different input object locations, defines bins that belong to the second bin group 302-2. In one embodiment, different bins are "defined" for different input object locations by specifying, for a particular input object location, the ranges of measurements that would belong in each bin that belongs in second bin group 302-2. The bins included in the second bin group 302-2 when an input object is determined to be in the center of the sensing region may be different than the bins that are included in the second bin group 302-2 when an input object is determined to be is in the corner of the sensing region.

At step 410, processing system 110 applies a second optional filter to the capacitive image obtained at step 402. The second filter may be constructed as described above with respect to the first filter, and thus may be a spatial and/or temporal filter as described above. The second filter may be identical to or different from the first filter. For example, the first filter may be a temporal filter and the second filter may be a spatial filter. In another example, both the first filter and the second filter include both spatial and temporal filters. In some embodiments, only a first filter is applied while in other embodiments, only a second filter is applied. In further embodiments, both a first filter and a second filter are applied and in yet other embodiments, no filter is applied.

At step 412, processing system 110 generates a histogram for the capacitive image. To do this, for each bin in the bins defined for the location of the input object 140, processing system 110 counts each measurement that falls within that particular bin. The histogram is constructed based on this counting procedure. Note that in some embodiments, after constructing the histogram, processing system 110 may normalize the histogram.

At step 414, processing system 110 calculates a force metric value as a function of values in the histogram bins. Techniques for calculating a force metric are described in greater detail below. At step 416, processing system 110 linearizes the force metric using a local correction. Linearization results in metrics that, for all different values of actual force, the estimate obtained as the force metric is a linear function of the actual force value.

FIG. 5 illustrates a method 500 for estimating force of multiple touch events based on presence of multiple input objects 140, according to an example. Although described with respect to the system of FIGS. 1 and 2A-2B, those of skill in the art will recognize that the method 500, performed in the context of any system capable of performing the method 500, and in various technically feasible alternative orders, falls within the scope of the present disclosure.

As shown, the method 500 begins at step 502, where an input device 100 obtains a capacitive image. A capacitive image includes sensing values for multiple locations in a sensing area. Processing system 110 may obtain the sensing values by driving sensor electrodes with sensing signals and receiving resulting signals in transcapacitive or absolute capacitive sensing mode. Processing system 110 may process the resulting signals received from the sensor electrodes by, for example, demodulating the signals, filtering the signals (e.g., via a low-pass filter), and converting the signals to digital values. The result of this processing is the capacitive image described above.

At step 504, processing system 110 optionally applies a first filter to the capacitive image. The first filter is optional and may comprise either or both of spatial and temporal filtering. The filtering techniques may be used to remove spatial or temporal artifacts. These filtering techniques may be as described with respect to the first (and second) filtering techniques of FIG. 4.

At step 506, processing system 110 determines the number and positions of two or more input objects 140 in the sensing region. In some embodiments, processing system 110 determines positions of an input object 140 as corresponding to local maxima in the capacitive image. In other words, the positions at which the highest values are found may be deemed to be the positions of the input objects 140. Other techniques for determining location of an input object are described above with respect to step 406 of FIG. 4.

At step 508, for each input object, processing system 110 finds, in a tuned map, a set of histogram bins corresponding to the determined position of the input object. These sets of histogram bins (one for each input object) correspond to the second bin group 302-2 described above. As described above, the tuned map includes pre-tuned data that, for different input object locations, defines bins that belong to the second bin group 302-2. Because there is more than one input object location in FIG. 5, processing system 110 may obtain more than one set of bin definitions that differ for the different input object locations. In some embodiment, the bin definitions do not differ by input object location, in which case the same set of bin definitions would be used for the different input object locations.

At step 510, processing system applies a second optional filter to the capacitive image obtained at step 402. The second filter may be similar to or different from the first filter, as described with respect to FIG. 4. Further, in various embodiments, either, both, or none of the first or second filters may be applied.

At step 511, processing system 511 segments the capacitive image based on the number and position of input objects. In some embodiments, segmenting the capacitive image comprises, for each input object, assigning a subset of the measurements in the capacitive image to be used for determining force applied by that input object. Such subsets of measurements may be determined based on pre-defined "templates" used to geometrically select a subset of the entire capacitive image. Templates may be shaped differently depending on the position of the input object. Preferably, templates are large enough to cover the area of the input device 100 in which signal resulting from applied force is distinguishable over the noise. Templates may account for sensor under-settling artifacts due to touch, which are usually referred to as "shadows" and which may correspond geometrically to touch sensor routings common in matrix sensor arrangements such as the arrangement shown in FIG. 2B. These shadows may be accommodated by excluding measurements from the sensor electrodes that are directly over the sensor routings (while including other measurements as defined by the template). In some embodiments, templates may be approximately circular and may have a radius approximately equal to 3.5 cm. Once particular measurements are selected based on the template, those measurements are used for generation of a histogram, while measurements that are not included are not used for generation of the histogram.

In some embodiments, processing system 110 uses an alternative method of selecting capacitive image measurements for inclusion in a histogram as compared with using "templates" or as compared with simply including all measurements in a capacitive image in a histogram. According to this alternative method, for each measurement, processing system 110 determines if the location of the measurement is greater than a threshold distance away from the touch location (i.e., the determined location of the input object). If the location of the measurement is greater than the threshold distance away from the touch location, the measurement is not included in the histogram and if the measurement is less than the threshold distance, the measurement is included in the histogram. Note that the measurement may be weighted by a weighting factor that is dependent on the distance of the measurement from the touch location.

If the measurement is at a location that is "shared" between two or more different touch locations of two or more different input objects, then the measurement is split between the histograms generated for the two different input objects. A measurement is at a location that is shared between two or more different input objects if the measurement is less than the threshold distance away from each of the two or more different input objects. In this situation, processing system 110 "splits" the measurement between the two or more different input objects by, for each input object, multiplying the measurement by a weight that is equal to the distance from the input object to the measurement divided by the sum of the distance of each input object to the measurement. The weight may be based on a comparison of the distances to the center of the touch location corresponding to the different detected input objects, comparisons between maximum sensed values for the touch location, or a comparison between the location of the particular measurement and boundaries corresponding to the different touch locations. Thus, in some embodiments, for any particular input object $I_N$, processing system weights the measurement $M_N$ for that input object by multiplying the measurement by the following:

$$\frac{D_N}{D_1 + D_2 + \ldots + D_M}$$

where $D_X$ is the distance from input object $I_X$ to the measurement. The weighted measurement is then used as one of the measurements for generating a histogram in step 512. The different weighted measurements for the two different touch locations would be included in the histogram for each touch location. In other embodiments, different techniques for weighting may be used.

The process for weighting measurements can be generalized to weight measurements by a $p^{th}$-degree, as follows:

$$(\alpha \cdot x^p + \beta \cdot y^p)^{1/P}$$

where $\alpha$ and $\beta$ are weights associated with horizontal and vertical measurements, respectively, where x and y represent horizontal and vertical location in the sensing area, and where p represents degree of the weighted measurement that may be varied as desired to reflect physical properties of the input device 100. $\alpha$ and $\beta$ may be determined empirically.

At step 512, processing system 512 generates a histogram for each input object. To generate the histogram, for each bin in the bins defined for the input object 140, processing system 110 counts each measurement that falls within that particular bin. Note that if measurements are excluded, those measurements are not included in the histogram, and if measurements are weighted, such weighted measurements are included in the histogram, instead of the unweighted measurement. Note that in some embodiments, after constructing the histogram, processing system 110 may normalize the histogram.

At step 514, for each input object, processing system 110 calculates a force metric value as a function of values in the histogram bins. Techniques for calculating a force metric are discussed in greater detail below. At step 516, processing system 110 linearizes the force metric using a local correction. Linearization results in metrics that, for all different values of actual force, the estimate obtained as the force metric is a linear function of the actual force value.

Techniques for creating the tuned map used to define histogram bins for step 408 of FIG. 4 and step 508 of FIG. 5 are now described. According to one technique, for every measurement in the capacitive image, a set of bins is found where, for each of those bins, a monotonic dependency of the number of counts in the bin versus force applied exists. This technique may be performed on a test version of input device 100 in pre-production testing and development. Moreover, this may be accomplished empirically by, for each location in a sensing region, varying the ranges of the bins as well as varying the force of input objects at the location, until a monotonically dependent relationship between force and count is observed for the bin. The result of this technique is a map that specifies, for each potential input object location, a set of bins to use for that location. Tuning bins is now described in greater detail.

To tune the bins, a tuner utilizes an optimization technique that maximizes the minimum deviation of varying force metrics with respect to differing input forces. First, note that $\tilde{F}$ refers to an estimate of force being applied. This estimate is the output of the force metric calculation.

The force metric estimate $\tilde{F}$ is defined as follows: $\tilde{F}=\text{ForceMetric}(x,y,B(x,y))$, where $B(x,y)$ is a set of count values in bins defined for an input object location at $(x,y)$. A calibrated force value used in tuning is as follows: $F_i^{cal} \in \text{TuningForceVector}=(F_i^{cal}, i=1\ldots C)$, $\forall i,j, i>j: F_i^{cal}>F_j^{cal}$. In other words, each calibrated force value in the set of calibrated force values that exists (from 1 to C) is monotonically increasing. Note that this value represents actual force applied, but the value that is determined by processing system 110 is an estimate of force, as follows: $\tilde{F}_i^{cal}(x,y,B(x,y))$ is an estimate of a force $F_i^{cal}$ applied at $(x,y)$, estimated using $B(x,y)$.

Note that tuning involves considering the $\Delta_i$ function, which represents the difference between two consecutive force estimate values. $\Delta_i(x,y,B(x,y))=\tilde{F}_i\text{cal}(x,y,B(x,y))-\tilde{F}_{i+1}^{cal}(x,y,B(x,y))$, $i=1\ldots C-1$.

Tuning of bins is performed by optimizing the definition of bins to produce $B^{tuned}(x,y)$, which is defined as: $B^{tuned}(x,y)=\text{argmax}_B(\min_{i=1\ldots C-1}\Delta_i(x,y))$, and $\forall i,j=1\ldots C-1$, sign $(\Delta_i(x, y, B(x,y)))=$sign$(\Delta_j(x, y, B(x,y)))\neq 0$. In other words, the tuning procedure determines the values of the ranges of the histogram bins for which the smallest difference between consecutive force estimate values is maximized. This tuning procedure also results in strict monotonicity of the tuned metric. Note, that a descending monotonicity of a response can be post-corrected. Physically a negative slope (descending monotonicity) may be caused by an air-gap under the display that is suppressed completely, or may be caused by a bent display module touching a support under it (so the module is supported not only on its edges).

Note that in some input device architectures, such as some active matrix sensing configurations (i.e., sensing configurations that include a matrix of electrodes as illustrated in FIG. 2B), the bin definitions do not vary for different input object locations. Thus, in some embodiments, the map may specify only a single set of bin definitions. Other techniques for generating such a map may be utilized alternatively or additionally.

Example techniques for performing step 414 of FIG. 4 and step 514 of FIG. 5—that is, for calculating a force metric based on the generated histogram—are now described. In some embodiments, a force-representative value is calculated as the mean count of entries in the bins that are defined in step 408 of FIG. 4 and step 508 of FIG. 4 (which are based on the tuned map). In some embodiments, a force estimate is obtained as the first moment of counts in the bins. In one example, the first moment is calculated as follows:

$$\frac{\sum_{i\in B} B(i) \cdot H(i)}{\sum_{i\in B} H(i)}$$

where $B(i)$ is a unity bin (i.e., a bin of step 1—going, for example, from values 0 to 1, 1 to 2, and so on) in the histogram belonging to the set B and $H(i)$ is a number of counts in the bin $B(i)$. In other embodiments, a force metric may be calculated based on a correlation coefficient between a pre-tuned set of reference measurements and the measurements in the tuned bins of the histogram. In some embodiments, instead of using a first moment, an "N-th" moment may alternatively be used to determine a force metric, where "N" is any positive integer.

Equalization ensures that an estimate of force is the same for all different input object locations. Processing system 110 may equalize the force metric obtained via the techniques described above. Equalization can be performed with a bowl-like function having a center towards the center of the sensing region and that attenuates force estimates in the center of the sensing region to a greater degree than force estimates outside of the center. A bowl function can be obtained empirically under controlled conditions by applying varying force at different locations and recording the difference between actual force applied and estimated force.

Note that the measurements that are included in the histogram may have a weight applied. More specifically, prior to determining which bin any particular measurement belongs in, the measurements may be weighted by a particular factor or transformed using a particular transform. Processing system 110 then places the weighted (or transformed) measurement in bins, using the weighted (or transformed) values of the measurements, instead of the unprocessed values. For example, if a particular bin includes measurements from 1-2 (arbitrary units), an unweighted measurement is 1.5 and a weighted measurement is 2.5, then processing system 110 does not place the measurement in the bin above. Several techniques for weighting or transforming measurements are now described.

In some embodiments, processing system 110 weights measurements based on a signal to noise ratio, and uses these weighted measurements to build the histogram, rather than the unweighted measurements. The "signal" in this ratio is the contribution to a measurement caused by the applied force and the "noise" in this ratio is the sum of the contribution to a measurement from an input object added to the contribution to the measurement from circuit noise.

Figure 6:
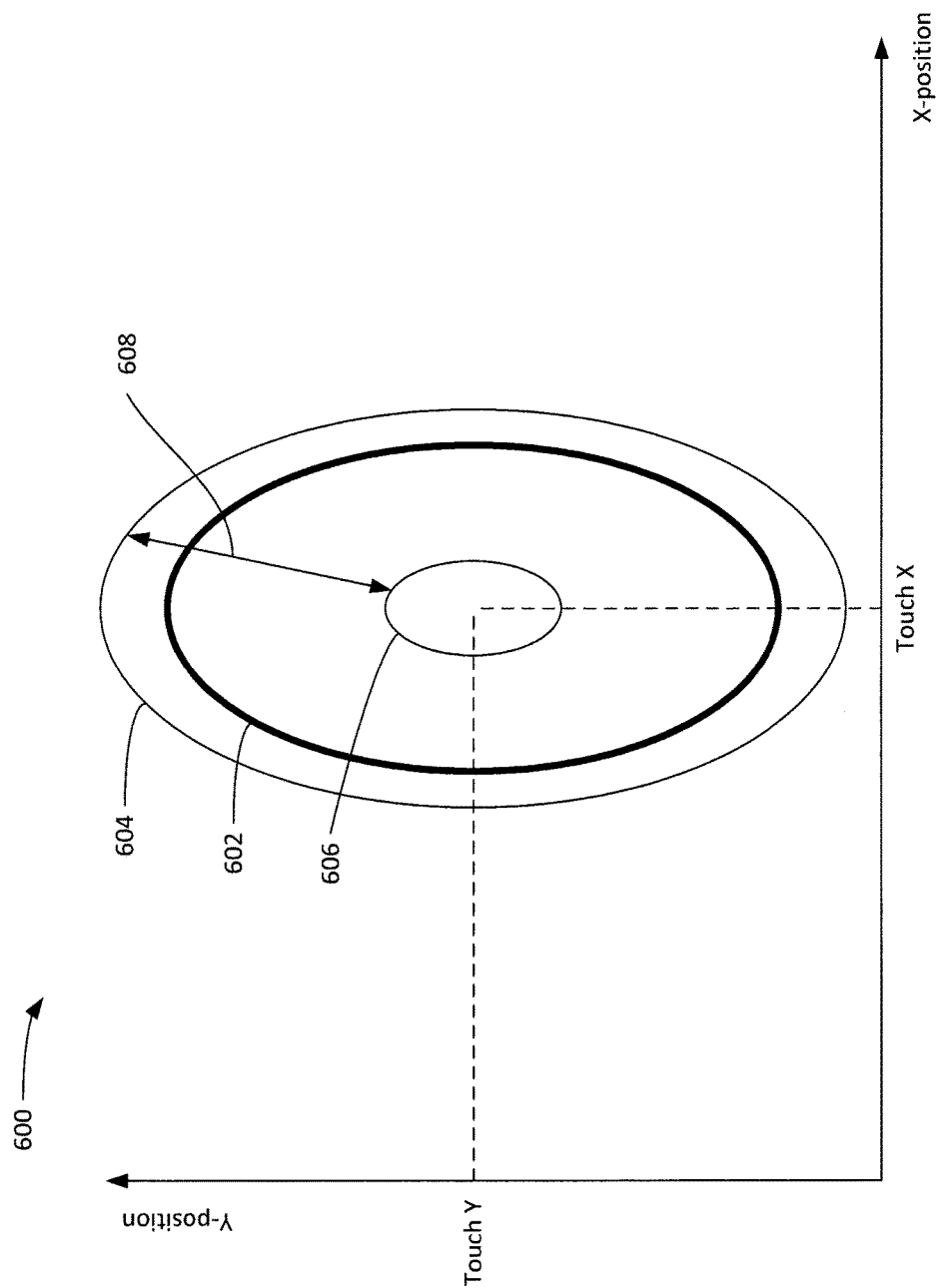
FIG. 6 illustrates a graph that shows geometrically-dependent weighting of measurements for signal-to-noise ratio, according to an example.

In some embodiments, this weighting process assumes a particular geometric distribution of signal-to-noise ratio. FIG. 6 illustrates a graph 600 that shows geometrically-dependent weighting of measurements for signal-to-noise ratio, according to an example. The x-axis of the graph 600 represents varying position in the x-direction of a sensing area and the y-axis of the graph represents varying position in the y-direction of the sensing area. Dashed lines intersect at the location where processing system 110 deems a touch event to occur. Outer extent 604 and (optional) inner extent 606 are geometric boundaries outside of which measurements are not included (e.g., are weighted by value zero). The maximum weight is applied to measurements located at maxima marker 602, which represents the location of highest "signal-to-noise," or the location where the contribution to signal from application of force is deemed to be greatest in comparison to circuit noise and signal from finger. Gradient indicator 608 represents the direction of decreasing weight, and terminates on outer extent 604 and inner extent 606. The weight applied to a particular signal decreases in the direction of the arrows of gradient indicator, with maximum at maxima marker 602. Note that inner extent 606 is optional because it is possible for the weight at the object location to be non-zero. The position and shape of inner extent 606, outer extent 604, and maxima marker 602, as well as the degree to which the weight drops off per gradient indicator 608 may be determined through empirical methods.

In another technique, instead of using the gradient shown and described with respect to FIG. 6, different regions in the sensing region may be pre-defined, each region having a weighting coefficient which may be the same or different across the different regions. Measurements falling in any particular region are weighted by the weighting coefficient assigned to that region.

According to another technique, instead of weighting measurements, measurements can be transformed according to a capacitance-to-force transform (with these transformed values used to generate the histogram, rather than the un-transformed values). The capacitance-to-force transform converts the measurements received from sensor electrodes to force-related values, instead of capacitance measurements. The capacitance-to-force transform also accounts for variations due to geometry, with the result that the resulting force-related values are geometry-independent.

The transform is based on the following relationship between capacitive measurement, force applied, and various physical aspects of an input device 100:

$$C(x, y, F) = \varepsilon_0 A \left( \frac{\varepsilon_{display}}{d_1(x, y)} + \frac{\varepsilon_{compress}}{d_2(x, y) - k(x, y)F} \right),$$

where: $\varepsilon_0$ is a constant the permittivity of vacuum; A is area of an electrode from which the measurement is obtained; $\varepsilon_{display}$, $\varepsilon_{compress}$ are dielectric constants of combined layers of a display under the sensor, and of a compressible layer between display above next layer of conductors, respectively (note that for a spongy material, $\varepsilon_{compress}$ is a function of $d_2$); $d_1(x,y)$ is a thickness of display under a location of the sensor electrode; $d_2(x,y)$ is a thickness of a compressible layer between a display element and a conductive layer in the input device 100, at the location of the sensor electrode; F is a force applied to the electrode—note that F is not the force that is being estimated as described above (which may be applied at a different location that the location at which F is being evaluated), but instead is a "partial force" at a particular location (x,y), that results from an actual force being applied at a different location (e.g., the touch location); and k(x,y) is a virtual spring coefficient at location (x,y). k(x,y) approximates a local bending of the input device 100 by a spring resisting the displacement of the electrode at location (x,y) to the actual force applied by an input objection.

Note that the C value expressed above represents an absolute measurement. A measurement that represents correction for baseline measurement is as follows:

$$\Delta C(x, y, F) = C(x, y, F) - C(x, y, 0)$$
$$= \varepsilon_0 A \left( \frac{\varepsilon_{compress}}{d_2(x, y) - k(x, y)F} - \frac{\varepsilon_{compress}}{d_2(x, y)} \right) =$$
$$= \frac{\varepsilon_0 \varepsilon_{compress} A}{d_2(x, y)} \cdot \frac{k(x, y)F}{d_2(x, y) - k(x, y)F}$$

Thus:

$$F = \frac{\Delta C(x, y, F) \cdot d_2(x, y)}{k(x, y) \cdot \left( \frac{\varepsilon_0 \varepsilon_{compress} A}{d_2(x, y)} + \Delta C(x, y, F) \right)}$$

This is the transform that is to be applied to the value $\Delta C(x,y,F)$. Processing system 110 uses the transformed values, rather than capacitive measurements, to generate the histogram referred to above.

Another way to weight data is, instead of weighting or transforming measurements prior to generating a histogram, first generating a histogram, and then weighting the counts in each bin. More specifically, after generate a histogram based on unweighted measurements, as described above, the counts for each bin are modified by dividing the count by a value that is proportional to the unity bin and using the modified counts to generate a force estimate as described above.

Note that the histogram utilized in calculating a force metric may come from one or multiple capacitive frames of data. To generate a histogram from multiple frames of data, instead of counting the number of measurements to put into bins from only one frame, processing system 110 counts the number of measurements to put into bins from multiple frames. In one example, when utilizing only a single frame, processing system 110 finds only a single measurement that falls within a particular bin for the single frame, and places that one measurement into that bin. In another example, when utilizing multiple frames, processing system 110 finds one measurement that falls within a particular bin from a first frame, another measurement that falls within that bin from a second frame, and another measurement that falls within that bin from a third frame, and places all such measurements into the bin. In some embodiments, processing system 110 uses 30 to 50 consecutive frames to generate a histogram.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:
1. A force sensing device, comprising:
   a plurality of sensor electrodes within a sensing region; and
   a processing system configured to:
      drive the plurality of sensor electrodes to acquire sensor data indicative of deflection of at least one sensor electrode of the plurality of sensor electrodes,
      generate a first histogram based on measurements determined from the sensor data, the first histogram including a plurality of bins each having a corre- sponding measurement range and an associated value, wherein the associated value for each of the plurality of bins corresponds to a count of the measurements that are within the corresponding measurement range, wherein the plurality of bins comprises a first bin group associated with locations of the sensing region affected by an input force applied by a first input object and a second bin group associated with locations of the sensing region affected by a capacitive coupling with the first input object, and based on the values associated with at least a subset of the plurality of bins of the first histogram, determine force information for the first input object.

2. The force sensing device of claim 1, wherein the processing system is further configured to:

generate a second histogram based on the sensor data, the second histogram corresponding to a second input object.

3. The force sensing device of claim 2, wherein:

the sensor data includes a first value associated with the first input object and obtained by a first sensor electrode at a first sensor electrode location and a second value associated with the second input object and obtained by the first sensor electrode at the first sensor electrode location; and the processing system is further configured to:

determine a first position of the first input object and a second position of the second input object, generate the first histogram based on a weighted first value that comprises the first value weighted based on a comparison between a first distance from the first position to the first sensor electrode location and a second distance from the first sensor electrode location to the second position, and generate the second histogram based on a weighted second value that comprises the second value weighted based on a comparison between the first distance and the second distance.

4. The force sensing device of claim 1, wherein:

the sensor data includes a first value associated with the first input object and obtained by a first sensor electrode at a first sensor electrode location; and the processing system is further configured to:

determine a first position of the first input object, and generate the first histogram based on a weighted first value that comprises the first value weighted based on a first distance from the first position to the first sensor electrode location.

5. The force sensing device of claim 1, wherein:

parameters of the plurality of bins of the first histogram used for the determination of the force information are determined during a tuning process.

6. The force sensing device of claim 1, wherein the processing system is configured to generate the first histogram by:

identifying a geometric mask aligned to a location of the first input object to obtain a subset of the sensor data, wherein the sensor data upon which the first histogram is based comprises the subset of the sensor data.

7. The force sensing device of claim 1, wherein the processing system is further configured to:

filter the acquired sensor data prior to generating the first histogram.

8. The force sensing device of claim 1, wherein the processing system is further configured to determine the force information by performing one of:

summing the values of the subset of the plurality of bins, or determining an Nth moment of the values of the subset of the plurality of bins.

9. A processing system, comprising:

a sensor circuitry, configured to drive a plurality of sensor electrodes within a sensing region to acquire sensor data indicative of deflection of at least one sensor electrode of the plurality of sensor electrodes; and a determination processor, configured to:

generate a first histogram based on measurements determined from the sensor data, the first histogram including a plurality of bins each having a corresponding measurement range and an associated value, wherein the associated value for each of the plurality of bins corresponds to a count of the measurements that are within the corresponding measurement range, wherein the plurality of bins comprises a first bin group associated with locations of the sensing region affected by an input force applied by a first input object and a second bin group associated with locations of the sensing region affected by a capacitive coupling with the first input object, and based on the values associated with at least a subset of the plurality of bins of the first histogram, determine force information for the first input object.

10. The processing system of claim 9, wherein the determination processor is further configured to:

generate a second histogram based on the sensor data, the second histogram corresponding to a second input object.

11. The processing system of claim 10, wherein:

the sensor data includes a first value associated with the first input object and obtained by a first sensor electrode at a first sensor electrode location and a second value associated with the second input object and obtained by the first sensor electrode at the first sensor electrode location; and the determination processor is further configured to:

determine a first position of the first input object and a second position of the second input object, generate the first histogram based on a weighted first value that comprises the first value weighted based on a comparison between a first distance from the first position to the first sensor electrode location and a second distance from the first sensor electrode location to the second position, and generate the second histogram based on a weighted second value that comprises the second value weighted based on a comparison between the first distance and the second distance.

12. The processing system of claim 9, wherein:

the sensor data includes a first value associated with the first input object and obtained by a first sensor electrode at a first sensor electrode location; and the determination processor is further configured to:

determine a first position of the first input object, and generate the first histogram based on a weighted first value that comprises the first value weighted based on a first distance from the first position to the first sensor electrode location.

13. The processing system of claim 9, wherein:

parameters of the plurality of bins of the first histogram used for the determination of the force information are determined during a tuning process.

14. The processing system of claim 9, wherein the determination processor is configured to generate the first histogram by:
identifying a geometric mask aligned to a location of the first input object to obtain a subset of the sensor data, wherein the sensor data upon which the first histogram is based comprises the subset of the sensor data.

15. The processing system of claim 9, wherein the determination processor is further configured to:
filter the acquired sensor data prior to generating the first histogram.

16. The processing system of claim 9, wherein the determination processor is further configured to determine the force information by performing one of:
summing the values of the subset of the plurality of bins, or
determining an Nth moment of the values of the subset of the plurality of bins.

17. A method, comprising:
driving a plurality of sensor electrodes within a sensing region to acquire sensor data indicative of deflection of at least one sensor electrode of the plurality of sensor electrodes;
determining measurements from a subset of the sensor data, and a count of the measurements that correspond to a first range of values, the first range of values having an upper threshold value and a lower threshold value, wherein the first range of values is one of a plurality of ranges of values and is associated with locations of the sensing region affected by an input force applied by an input object, and a second range of values of the plurality of ranges of values is associated with locations of the sensing region affected by a capacitive coupling with the input object; and
based on the subset of the sensor data, determining force information for the input object.

18. The method of claim 17, wherein determining the force information comprises one of:
summing values of the subset of the sensor data, or
determining an Nth moment of values of the subset of the sensor data.

19. The method of claim 17 further comprising generating a first histogram based on the sensor data, the first histogram including a plurality of bins each having an associated value and wherein the subset of the sensor data corresponds to one of the plurality of bins.

20. The method of claim 17, further comprising:
determining second measurements from a second subset of the sensor data, and a count of the second measurements that correspond to a third range of values, the third range of values having an upper threshold value and a lower threshold value; and
based on the second subset of the sensor data, determining force information for a second input object.

21. The method of claim 20, wherein:
the sensor data includes a first value associated with the input object and obtained by a first sensor electrode at a first sensor electrode location and a second value associated with a second input object and obtained by the first sensor electrode at the first sensor electrode location; and
wherein the method further comprises:
determining a first position of the input object and a second position of the second input object,
generate a weighted first value that comprises the first value weighted based on a comparison between a first distance from the first position to the first sensor electrode location and a second distance from the first sensor electrode location to the second position, and
generate a weighted second value that comprises the second value weighted based on a comparison between the first distance and the second distance.

* * * * *

UNITED STATES PATENT AND TRADEMARK OFFICE
CERTIFICATE OF CORRECTION

PATENT NO. : 10,261,619 B2
APPLICATION NO. : 14/986088
DATED : April 16, 2019
INVENTOR(S) : Petr Shepelev and Arnulf Graf Page 1 of 1

It is certified that error appears in the above-identified patent and that said Letters Patent is hereby corrected as shown below:

In the Specification

Column 19, Line 40, delete "$\Delta_i(x,y)))$," and insert -- $\Delta_i(x,y,B(x,y)))$, --, therefor.

Signed and Sealed this
Twenty-first Day of April, 2020

Andrei Iancu
*Director of the United States Patent and Trademark Office*